Patented May 9, 1939

2,157,633

UNITED STATES PATENT OFFICE 2,157,633

BEER AND METHOD OF PREPARING SAME

Abraham Schapiro, Chicago, Ill.

No Drawing. Application February 2, 1939,
Serial No. 254,158

9 Claims. (Cl. 99—31)

This invention relates to fermented malt beverages and particularly to methods of maturing and stabilizing beer and to the resulting product.

Fermented malt beverages such as beer or ale are usually produced from water, hops, yeast and malt or like amylaceous substances by a conventional brewing process. In the brewing of beer, for example, the malt is crushed, mixed with water and, if desired, other cereal grains, and the mixture heated at controlled temperatures until the enzymes of the malt convert the amylaceous substances into soluble sugars and dextrines. The resulting solution or wort is then removed from the spent grains and boiled with hops. Following this treatment the hops are removed and the wort cooled, at which time yeast is added to start the alcohol fermentation.

During fermentation, the soluble sugars are converted into alcohol. When the desired percentage of alcohol is formed, usually in the order of from about 2 to 6% and even higher, the resulting beer is separated from the yeast and is stored for rather long periods of time in the order of from about 30 to 60 days to mature or age the beer and permit undesirable matter to settle out. During this ageing period, the subtle flavors and aroma as well as other desirable beer characteristics are formed.

In accordance with the present invention, I have found that by treating the beer during the brewing process with suitable amounts of monochloracetic acid or like water and/or alcohol soluble non-toxic chlorinated compounds, I can materially hasten the ageing period and at the same time produce a beer having all of the desired characteristics as to flavor, aroma and the like. By operating in accordance with my invention, I can produce a matured and aged beer in from about 3 to 10 days. It appears that the non-toxic chlorinated compounds used in accordance with my invention promote and accelerate the formation of the esters which are, in part, responsible for the flavor and aroma of beer. While these compounds may not necessarily increase the quantity of esters which would otherwise normally form in the beer during the ageing or maturing stage, they do, however, hasten the ester formation and at the same time appear to convert at least some of the normally formed esters into esters capable of imparting a better flavor and aroma to the beer.

The treatment of the beer in accordance with my invention also appears to render the protein bodies in the beer stable during wide temperature changes, even at reduced temperatures of about 29° to 32° F. and below. On the other hand, in accordance with the prior art practice, it is customary to stabilize the proteins by the addition of "chillproofing" agents to the beer during the ageing process. Since most of these "chillproofing" agents are usually enzymes such as, for example, pepsin, papain and the like which require care in their preparation and, in consequence, are rather costly, it is obvious that by operating in accordance with my invention I am enabled to accomplish the desired stabilization of the protein bodies in a very simple and inexpensive manner.

Other advantages flowing from the preparation of beer in accordance with my invention will be hereinafter set forth.

In carrying out my invention I treat fermented wort or unmatured beer with suitable amounts of monochloracetic acid or like water and/or alcohol soluble non-toxic chlorinated compounds. In my preferred practice, I treat the wort preliminarily with a small amount of the treating compound and subsequently treat the fermented wort with the rest of the desired amount of the compound. The treatment may be effected in any desirable manner as by mixing the non-toxic agent with the wort and/or fermented wort in a suitable vessel as, for example, a glass-lined or like acid-resisting vessel suitably made from Monel metal, stainless steel and the like. The treatment is carried out preferably at room temperature, however, if desired, slightly elevated temperatures in the order of about 90 to 95° F. may be employed.

In practicing my invention, I prefer to treat the wort and/or fermented wort with monochloracetic acid; however, other non-toxic water and/or alcohol soluble monochloracetic acid compounds may be used. Thus, for example, I have successfully treated wort and/or fermented wort in accordance with my invention with the ethyl, glycol and glycerol esters of monochloracetic acid. Other esters of monchloracetic acid as well as the aldehydes, ketones, ethers and alkali metal salts of this acid may likewise be used. I have also found that the water-soluble monochlor-aliphatic acids having from 3 to 5 carbon atoms in the chain and the non-toxic water and/or alcohol soluble derivatives thereof may likewise be used; however, these compounds are not in general as effective as the corresponding monochloracetic acid compounds.

The quantity of the non-toxic chlorinated compound used in accordance with my invention may vary rather widely; however, I prefer in general not to utilize more than about 800 to 900 parts thereof per million parts of fermented wort or beer. For most purposes, I have accomplished the desired result with from about 50 to about 400 parts of the compound per million parts of the fermented wort and in my preferred practice, I utilize about 250 to 300 parts of the compound per million parts of the fermented wort or beer.

The following example illustrates my invention. It is, of course, to be understood that my invention is not to be construed as limited to the specific details disclosed in this example since these details may obviously be varied without departing from the scope of the invention disclosed herein.

*Example*

To 1000 gallons of wort, produced in any desirable manner, in a suitable vessel, there is added about 2 ounces of monochloracetic acid and the mixture is agitated in any suitable manner until the acid is dissolved in the wort. The yeasts are now added to start fermentation. The monochloracetic acid appears to sterilize the weaker yeasts and thereby renders the remainder thereof more virile and efficient. In consequence, by the presence of a small amount of monochloracetic acid I am enabled to obtain a more favorable type of fermentation, during which the vigorous action of the live yeasts inhibit the growth and development of foreign organisms which affect flavor and aroma.

After this main and desirable fermentation has subsided, which usually takes place after from about 5 to about 12 days, the other organisms in the fermented wort, mainly, wild yeasts, bacteria and the like, may start their undesirable action. By the addition of about 8 ounces of monochloracetic acid at this time, I may retard further undesirable fermentation changes and at the same time promote the development of the desirable esters. By the addition of still further amounts of monochloracetic acid at this time up to a total amount of about 50 ounces and more, if desired, the fermented wort is chillproofed and is stabilized against further fermentation. The fermented wort or beer is now filtered and placed in storage where it matures or ripens into a stable, chillproofed beer of desirable flavor and aroma. The maturing or ripening period of a beer produced as above described is in the order of about 4 to 5 days.

The quantity of monochloracetic acid or like nontoxic compound which may be added to the wort prior to addition of the yeast, may vary from about ½ ounce to about 3 ounces to each one thousand gallons of wort; and the quantity of the compound which may be added after the main and desirable fermentation has subsided may vary from about 4 ounces to about 20 ounces to each thousand gallons of fermented wort. It is, of course, to be understood that either one or the other of these two preliminary treating steps and particularly the latter may be omitted especially in those instances where it is desired to produce a chillproofed beer. In these latter instances, all of the desired amount of the non-toxic compound may be added to the fermented wort immediately after the main and desirable fermentation has subsided. This amount, as pointed out above, need not in general exceed about 400 parts of the compound per million of the fermented wort (about 80 ounces of the compound per thousand gallons of fermented wort) and for most purposes, the addition of about 250 to about 300 parts of the compound per million of the fermented wort is sufficient. I have found in general that a better beer results when the fermentation of the wort takes place in the presence of a small amount of the non-toxic compound as described above.

In the event that a chillproofed beer is not especially desired, the fermented wort may be placed in storage for ripening subsequent to the addition of the third amount of the compound as set forth in the example. In this latter event, the quantity of monochloracetic acid or like compound added to the fermented wort after the main fermentation has subsided may be increased up to 25 ounces per thousand gallons of wort and even higher.

As a comparison, tests were made on a beer produced in accordance with a prior art method and on a beer produced by the same method, but modified by the treatment described above. For convenience, the former beer will be designated by the letter A and the latter, the beer in accordance with my invention, by the letter B.

Beer A was cloudy and somewhat lumpy and had a yeasty taste. Beer B was very clear and free from lumps and the undesirable yeasty flavor. Microscopical examinations were made upon the sediments secured by centrifuging the two beers. The sediment from beer B contained only dead yeast and amorphous particles and the amount thereof was so slight that it was not visible to the naked eye. On the other hand, the sediment from beer A was clearly visible to the naked eye and consisted almost entirely of sound and weak yeast cells.

Both beers were plated on maltose agar and at the end of 72 hours the plates containing beer A showed the presence of innumerable yeast colonies; whereas, but one colony of yeast was formed on the plate containing beer B.

Beer produced in accordance with my invention is clear, free from lumps and has none of the undesirable yeasty taste which characterizes many of the prior art beers. It is a palatable, mature beverage which remains stable in barrels, cans, bottles or like containers even after prolonged storage. My beer has all of the characteristics of a chillproofed beer yet it does not contain any of the chillproofing agents normally used in the prior art to render the protein bodies in the beer stable during wide temperature changes. While my beer may become somewhat cloudy when cooled down to about 32° F. and below, it will, on being brought back to the normal drinking temperatures, turn clear and bright. In general, light and temperature changes do not deleteriously affect beers produced in accordance with my invention.

Beer produced in accordance with my invention may be pasteurized at considerably lower temperatures than the temperatures now utilized in pasteurizing the prior art beers. In accordance with the prior art, beer, before bottling, is pasteurized at temperatures varying from about 150 to 180° F. for varying lengths of time from about 15 to 20 minutes and even longer. This pasteurizing treatment imparts to the prior art beers a "cooked taste" which renders the beer objectionable. Beer produced in accordance with my invention may be pasteurized at comparatively low temperatures in the order of about 100 to 120° F. for about 3 to 5 minutes and the resulting beer has none of the "cooked taste"

which is characteristic of most of the prior art pasteurized beers.

While I have described my invention specifically in connection with the preparation of beer, it is, of course, obvious that my invention is also applicable to the preparation of ales and like fermented malt beverages.

I claim:

1. In the method of brewing fermented malt beverages to produce a stabilized product, the step of treating the wort with a small amount of a non-toxic monochloracetic acid compound whereby the flavor of the beverage is improved and the maturity thereof hastened.

2. In the method of brewing fermented malt beverages to produce a stabilized product, the steps comprising treating the wort with a small amount of a non-toxic monochloracetic acid compound, adding yeast to the treated wort to ferment it and adding additional monochloracetic acid compound to the fermented wort whereby the flavor of the beverage is improved and the maturity thereof hastened.

3. In the method of preparing fermented malt beverages to produce a stabilized product, the step of treating the fermented wort with a non-toxic monochloracetic acid compound whereby the flavor of the beverage is improved and the maturity thereof hastened.

4. In the method of preparing a stabilized beer, the step of treating the fermented wort with monochloracetic acid whereby the flavor of the beer is improved and the maturity thereof hastened.

5. In the method of brewing a stabilized beer, the step of treating the wort with a small amount of monochloracetic acid whereby the flavor of the beer is improved and the maturity thereof hastened.

6. In the method of brewing a stabilized beer, the steps comprising treating the wort with a small amount of monochloracetic acid, adding yeast to the treated wort to ferment it and adding additional monochloracetic acid to the fermented wort whereby the flavor of the beer is improved and the maturity thereof hastened.

7. In the method of brewing a stabilized beer, the steps comprising treating the wort with a small amount of monochloracetic acid, adding yeast to the treated wort to ferment it, adding additional monochloracetic acid to the fermented wort whereby the flavor of the beer is improved and the maturity thereof hastened and pasteurizing the wort so treated.

8. A stable fermented malt beverage containing a non-toxic monochloracetic acid compound and stabilized thereby.

9. A beer containing monochloracetic acid and stabilized thereby.

ABRAHAM SCHAPIRO.